United States Patent [19]

Bowman

[11] Patent Number: 4,939,742
[45] Date of Patent: Jul. 3, 1990

[54] NEUTRON-DRIVEN GAMMA-RAY LASER

[75] Inventor: Charles D. Bowman, Los Alamos, N. Mex.

[73] Assignee: The United States of America as represented by the United States Department of Energy, Washington, D.C.

[21] Appl. No.: 329,710

[22] Filed: Mar. 28, 1989

[51] Int. Cl.$^5$ .............................................. H01S 3/30
[52] U.S. Cl. .......................................... 372/5; 372/73; 372/66
[58] Field of Search ........................... 372/5, 66, 73, 69

[56] References Cited

U.S. PATENT DOCUMENTS 4,827,479  5/1989  Campbell et al. ...................... 372/66

OTHER PUBLICATIONS

G. C. Baldwin et al;, "Approaches to the Development of Gamma-Ray Lasers," 53 Rev. Mod. Phys., No. 4, Part 1, pp. 687–744, Oct. 1981.

Primary Examiner—Léon Scott, Jr.
Attorney, Agent, or Firm—Ray G. Wilson; Paul D. Gastjens; William R. Moser

[57] ABSTRACT

A lasing cylinder emits laser radiation at a gamma-ray wavelength of 0.87 Å when subjected to an intense neutron flux of about 400 eV neutrons. A 250 Å thick layer of Be is provided between two layers of 100 Å thick layer of $^{57}$Co and these layers are supported on a foil substrate. The coated foil is coiled to form the lasing cylinder. Under the neutron flux $^{57}$Co becomes $^{58}$Co by neutron absorption. The $^{58}$Co then decays to $^{57}$Fe by 1.6 MeV proton emission. $^{57}$Fe then transitions by mesne decay to a population inversion for lasing action at 14.4 keV. Recoil from the proton emission separates the $^{57}$Fe from the $^{57}$Co and into the Be, where Mossbauer emission occurs at a gamma-ray wavelength.

13 Claims, 2 Drawing Sheets

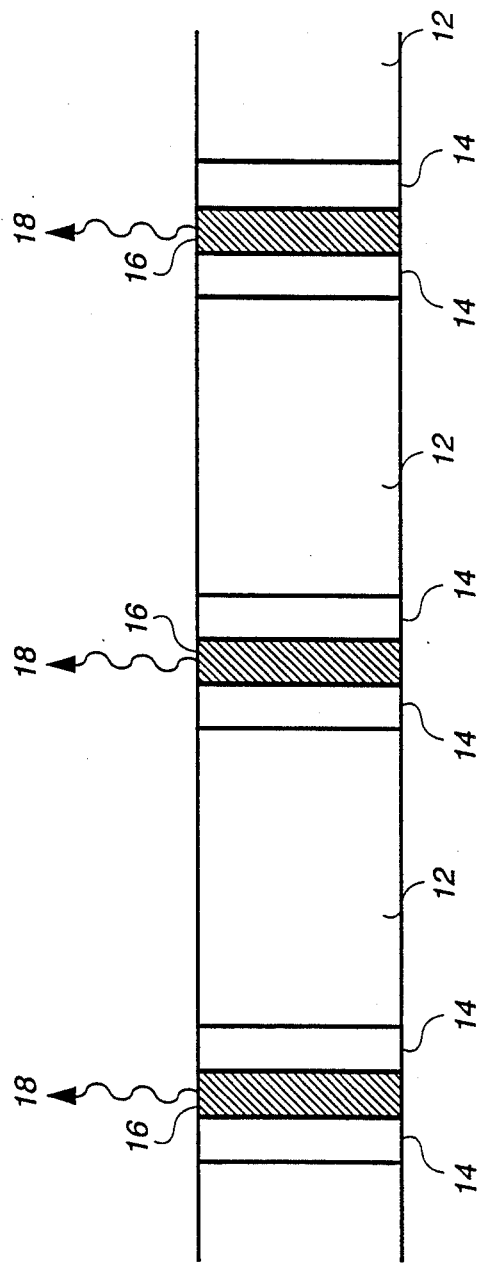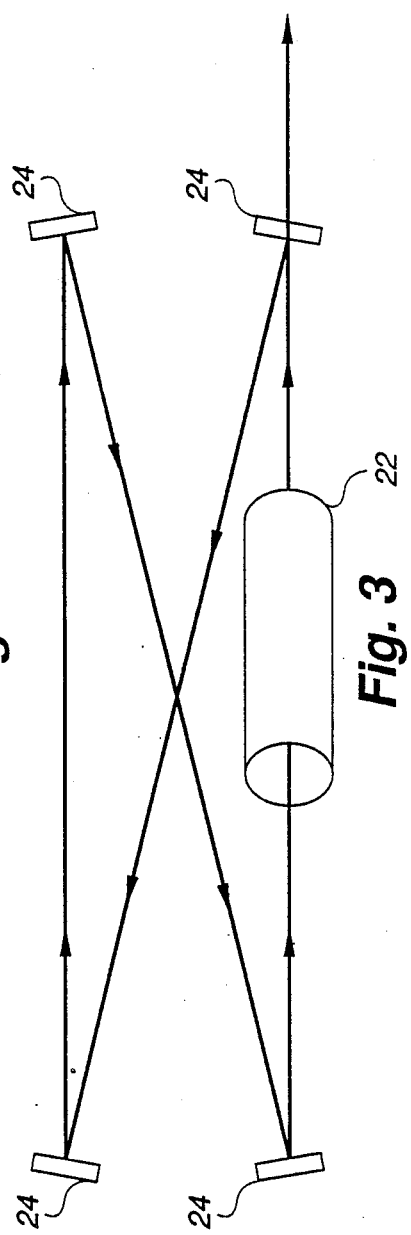

NEUTRON-DRIVEN GAMMA-RAY LASER

BACKGROUND OF THE INVENTION

This invention generally relates to gamma-ray lasers and more particularly relates to Mossbauer effect gamma-ray lasers. This invention is the result of a contract with the Department of Energy (Contract No. W-7405-ENG-36).

The development of sources of coherent radiation has progressed steadily toward shorter wavelengths. Current devices make use of high energy transitions in atoms for photon generation in the wavelength range down to about 50 Å. The development of lasers that would generate radiation at still shorter wavelengths, comparable to atomic dimensions, would greatly extend the applications of lasers. The development of a gamma-ray laser (graser) would combine the characteristics of gamma-ray radiation (i.e., penetration, ionizing ability, short wavelength, interaction with electrons in inner shells of atoms and with nuclei) with the properties of radiation generated by stimulated emissions (coherence, intensity, monochromaticity, directionality, time and frequency dependence, etc.).

A review of various approaches to gamma-ray laser development is found in G. C. Baldwin et al., "Approaches to the Development of Gamma-Ray Lasers," 53 Rev. Mod. Phy., No. 4, Part I, pp. 687-744, incorporated herein by reference. A nuclear transition is required with an intermediate lifetime in at least the nanosecond range, with transition energies in the 6- to 120-keV energy range in order to yield coherent radiation in the wavelength range between 0.1 to 2 Å. A substantial portion of the literature is particularly directed to the application of recoilless emission and absorption (Mossbauer effect) to enhance the stimulated emission probability.

For previously proposed concepts requiring recoilless emission and absorption, the intensity of radiation necessary for creating the required inversion density is so intense that the laser would be vaporized before the conditions can be established to obtain lasing action. The pumping radiation can be reduced if the nucleus is transmuted to a second species in the pumping process, but the required radiation is still too intense to obtain the necessary state population inversion for lasing. To further reduce the required pumping intensity it has been suggested to physically separate the pumping and the lasing process. For intermediate lifetime isomers, separation schemes are suggested by Baldwin et al., page 706. For a short lifetime isomer, Baldwin et al., page 706, discuss a cylinder filled with Kr and having a center wire of beryllium. On ionization, the excited Kr would be drawn by an electric field to the Be wire and implanted in the Be for subsequent Mossbauer radiation.

Thus, it has been suggested that excited isomers be separated from unexcited isomers and then implanted in a host material, such as Be, that can bind the atoms with sufficient strength in the lattice to establish the required Mossbauer conditions. The separation and implantation must be accomplished, however, in a time small compared to the halflife of the transition. Since Mossbauer conditions have not been observed for nuclei with halflives greater than about $10^{-6}$ seconds, these manipulations must occur very rapidly.

In accordance with the present invention, a gamma-ray laser configuration provides for the separation and implantation of an excited isomer in a time small compared to the transition halflife. The radiation pumping requirements are reduced to intensities which do not disturb the integrity of the material establishing the Mossbauer conditions.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a gamma-ray laser rod effective for lasing by interaction with a neutron flux with a radiation intensity which does not destroy the integrity of a substrate lattice suitable to establish Mossbauer conditions for an implanted isomer. A foil material supports layers of nuclear species which form the lasing action for coiling to form a lasing cylinder rod. A first nuclear species is deposited on both sides of the supporting foil, where the first nuclear species is selected to interact with the neutron flux for transition to a second nuclear species by a particle emission effective to impart a recoil velocity to atoms of the second nuclear species for separating the second nuclear species from the first nuclear species, where the second nuclear species is in an excited state effective for radiation at the gamma-ray wavelength after the transition. A high Debye temperature host material, effective to support Mossbauer emissions, is deposited on one of the deposits of the first nuclear species for receiving the separated second nuclear species. The first nuclear species is deposited on the foil to a first thickness effective for the recoil velocity to separate the second nuclear species from the first nuclear species and implant the second nuclear species in the host material. The host material is deposited to a second thickness effective to stop the second nuclear species with the recoil velocity and establish Mossbauer conditions during decay of the second nuclear species at the gamma-ray wavelength.

In another characterization of the present invention, a method is provided for generating a gamma-ray wavelength laser output. A layer of a high Debye temperature receiving host material is arranged between two layers of a first nuclear species having an interaction with a neutron flux effective to transition by particle emission to a second nuclear species with atoms in an excited state for decay at the gamma-ray wavelength in a Mossbauer emission. The first nuclear species is irradiated with a neutron flux effective for capture by the first nuclear species, wherein the resulting decay by particle emission of the first nuclear species to a second nuclear species produces a recoil velocity in the second nuclear species for propelling the second nuclear species from the layer of the first nuclear species and into the host material to establish Mossbauer emission conditions in a time effective for the decay at gamma-ray wavelengths to generate a laser output.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 2 is an axial cross-sectional view of a lasing cylinder according to the present invention.

FIG. 3 is a schematic view of laser apparatus according to one embodiment of the present invention.

DETAILED DESCRIPTION OF THE INVENTION

Figure 1:
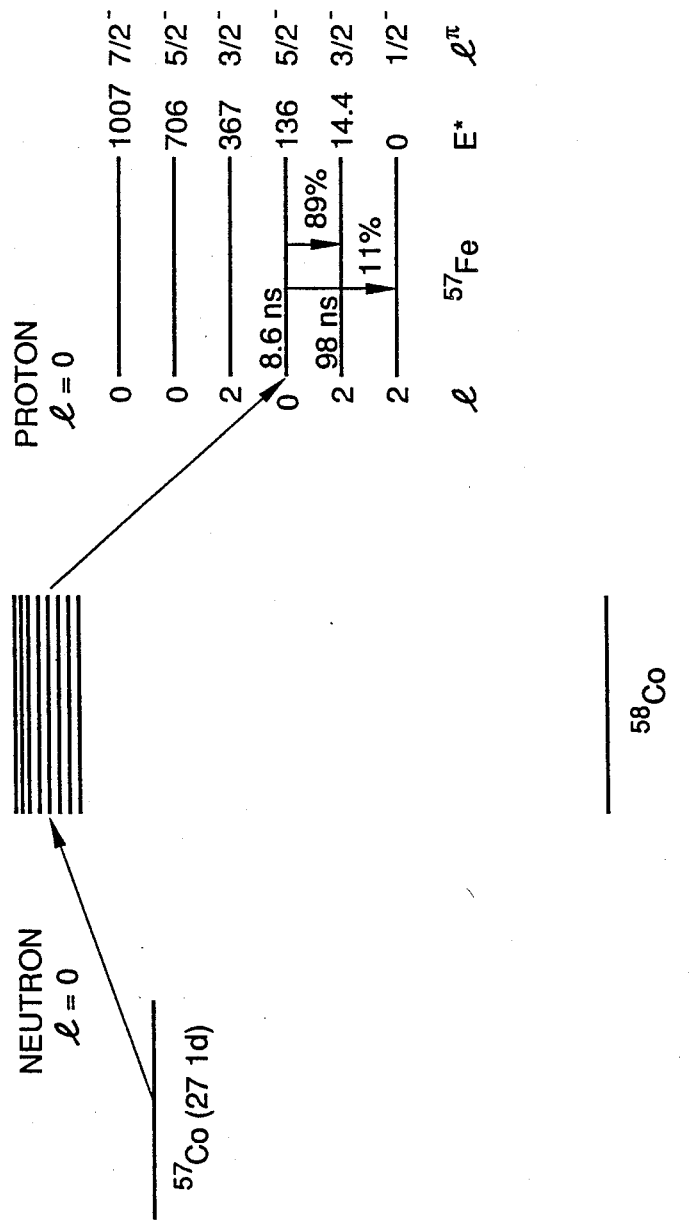
FIG. 1 is a state diagram for $^{57}$Co transmuting to $^{57}$Fe.

A gamma-ray laser has a wavelength in the neighborhood of 1 Å or less and operates on nuclear rather than electron transitions. In accordance with one embodiment of the present invention, a first nuclear species, e.g. $^{57}$Co, is pumped by an intense burst of eV and keV neutrons. The resulting isomer, e.g. $^{58}$Co, decays by particle emission to a second nuclear species, e.g. $^{57}$Fe, in an excited state effective for decay at a gamma-ray wavelength. Recoil from the particle emission, e.g. the 1.6 MeV proton emission from $^{58}$Co, propels the excited nucleus of the second nuclear species out of the thin layer of the first nuclear species and imbeds it into a layer of a host material with a high Debye temperature, e.g. beryllium or diamond. By way of example, proton emission from $^{58}$Co leaves the $^{57}$Fe nucleus in its 136 keV state, which subsequently decays to the 14.4 keV state of $^{57}$Fe, creating the required population inversion for lasing action. The 14.4 keV transition corresponds to an emission wavelength of 0.875 Å. The density of $^{57}$Fe may be sufficiently great that a lasing action can occur with or without resonator mirrors.

The 14.4 keV excited state in $^{57}$Fe is the most used transition in Mossbauer science. This transition level scheme is depicted in FIG. 1, along with the reactions leading to the transition from $^{57}$Co to $^{57}$Fe. At low neutron energies, zero angular momentum particle transitions predominate so that the primary reaction with neutrons in the 100 eV to 10,000 eV range leads to the transmutation of $^{57}$Co to the 136 keV state of $^{57}$Fe by neutron absorption and proton emission by $^{58}$Co. The 3$^-$ transitions decay by $l=0$ proton emission to the 136 keV state of $^{57}$Fe. This state decays 89% of the time to the 14.4 keV state, giving a 9/1 population inversion with the ground state.

The estimated (n,p) cross section of $^{57}$Co in the neutron energy range of interest is compatible with the need to maintain a neutron intensity which does not destroy the integrity of the Mossbauer host material. $^{57}$Co is estimated to have a resonance at about 400 eV based on an energy level spacing of about 800 eV for the 3$^-$ states of $^{59}$Co. The estimated neutron strength function, coulomb barrier penetrability, and radiative decay width give a peak (n,p) cross section of about 300 barns and a width of about 7 eV at the 400 eV resonance. A comparison of the preliminary measurement of the thermal cross section of 6±1.5 barns with the estimated thermal cross section of about 3 barns substantiates the validity of the estimation process for deriving the cross sections used in projecting laser performance. The following performance estimates are based on the above estimated cross section.

In principle, an inversion could be produced directly in a $^{57}$Fe medium, but the required radiation intensity would destroy any substrate for supporting the Mossbauer effect. An inversion is created more easily by the proposed neutron reaction in a $^{57}$Co medium. Even then the neutron fluence would vaporize the medium and/or destroy the required Mossbauer recoil-free emission. However, if the $^{57}$Co is deposited in a thin layer of a surface such as Be, the excited $^{57}$Fe can be knocked free of the $^{57}$Co by the 28 keV nuclear recoil arising from the 1.6 MeV proton emission from $^{58}$Co. The small recoil energy limits the useful thickness of the $^{57}$Co layer to about 100 Å ($8.4 \times 10^{16}$ atoms/cm$^2$).

The separated $^{57}$Fe nuclei are then stopped in a host material with a high Debye temperature in order to preserve the recoilless emission at as high a host temperature as possible. A beryllium thickness of about $3 \times 10^{17}$ atoms/cm$^2$ (250 Å at half density) will stop the $^{57}$Fe recoils. An axial cross section through a lasing cylinder which could be constructed according to the present invention is shown in FIG. 2. A 100 Å layer of $^{57}$Co 14 is deposited on both sides of a foil 12. Foil 12 may be formed from any suitable material which is compatible with the lasing action described below. One suitable material is a foil of 0.005 cm thick Be, although Al could be used. One side of foil 12 is then coated again with a 250 Å thick layer of beryllium, powdered diamond, or other high Debye temperature material. The material layers may be formed from any suitable conventional process, such as vacuum evaporation or sputtering. The foil is then rolled into a cylinder. The performance estimates presented herein assume a 10 cm long foil, rolled to a cylindrical diameter of about 1 cm. Lasing action occurs in the direction of the cylinder axis.

The dimensions of the lasing medium are determined along the radius by the thickness of the $^{57}$Fe lasant host material, which is 250 Å. In the theta direction (perpendicular direction to the radius), the thickness is determined by the curvature of the foil and the length of the cylinder. For a radius of 0.5 cm the thickness is approximately 0.001 cm. The divergence of a superradiant laser is determined either by the diffraction limit, or by the geometrical limit, whichever is larger. For the above geometry, the 0.001 cm dimension for a 10 cm length gives a divergence half-angle of about $1.0 \times 10^{-4}$ radians. The diffraction limit for this geometry is larger, 0.005 radians, and is the governing factor. The divergence can be substantially reduced by the use of mirrors, as shown in FIG. 3.

It will be appreciated that the lifetime of the excited $^{57}$Fe is 90 ns, a lifetime sufficiently long to enable substantial gain improvements from using mirrors in the resonator loop. A suitable geometry using mirrors is shown in FIG. 3. Lasing cylinder 22 is formed from the coated foil shown in FIG. 2 and mirrors 24 define the resonator geometry. A path length of about 1 meter would provide about 30 passes of the light emitted during the excited lifetime of the $^{57}$Fe. Mirrors 24 may be formed of single crystals used in a diffraction mode, e.g. silicon or calcium fluoride. Since the diffraction mode reflection is through an angle determined by the crystal, the geometry depicted in FIG. 3 enables the laser beam to be rotated through 360° to form a resonator loop. Since even a relatively low reflectivity, e.g. 50%, is acceptable, most single crystals are acceptable. The gain of the laser per pass is high enough to realize significant laser output gain even with this reflectivity.

Gamma-ray lasers provide the capability for focusing the output beam with diffractive materials, i.e., $^{57}$Fe in the above example. This arises from the strong coherent scattering cross section which is the property of a laser having the lasing transition to the ground state of the lasing medium. The resulting coherent scattering provides an index of refraction analogous to that of optical materials. The $^{57}$Fe lasing transition discussed above produces coherent radiation having a coherent scattering cross section of about one million barns from a $^{57}$Fe optical element.

Although the above example uses $^{57}$Co as the first nuclear species, a suitable first nuclear species will interact with neutrons to produce a recoil reaction, e.g. (n,p), (n, alpha), (n, $^3$He) and thereby be transformed to a second nuclear species in an excited state having a Mossbauer transition. The suitable first nuclear species will be provided in a layer thin enough for the recoil from the particle emission to propel the second excited nuclear species from the layer and into an adjacent host material effective to support the Mossbauer emission. The suitable first nuclear species identified to date is $^{57}$Co, but the invention is not limited to this single species. Suitable receptive materials for supporting the Mossbauer emission include materials with a very high Debye temperature and atomic number less than oxygen, such as Be and diamond.

The foregoing description of an embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gamma-ray laser rod emitting a radiation beam of gamma-ray wavelength when excited with a neutron flux, comprising:
    a lasing cylinder having a rolled foil material as a support structure;
    a first nuclear species deposited on both sides of said foil, said first nuclear species interacting with said neutron flux for transition to a second nuclear species by a particle emission effective to impart a recoil velocity to atoms of said second nuclear species for separating said second nuclear species from said first nuclear species, said second nuclear species being formed from said first nuclear species in an excited state generating a population inversion with a ground state for spontaneous emission at said gamma-ray wavelength;
    a high Debye temperature host material, binding said second species for recoilless Mossbauer emissions from said excited state of said second nuclear species, deposited on one of said deposits of said first nuclear species;
    said first nuclear species being deposited to a first thickness enabling said recoil velocity to separate said second nuclear species from said first nuclear species and into said host material;
    said host material being deposited to a second thickness to stop said second nuclear species with said recoil velocity for said binding said second nuclear species for said Mossbauer emission from said second nuclear species at said gamma-ray wavelength, thereby producing an amplified spontaneous emission device for producing a gamma-ray wavelength.

2. A gamma-ray laser rod according to claim 1, wherein said host material is selected from the group consisting of beryllium and diamond.

3. A gamma-ray laser rod according to claim 2, wherein said first nuclear species is $^{57}$Co.

4. A gamma-ray laser rod according to claim 3, wherein said first thickness of said deposited first nuclear species does not exceed 100 Å.

5. A gamma-ray laser rod according to claim 4, wherein said second thickness of said host material is at least 250 Å.

6. A gamma-ray laser rod according to claim 1, wherein said first nuclear species is $^{57}$Co.

7. A gamma-ray laser rod according to claim 1, further including a plurality of mirrors cooperating with said laser cylinder to establish a resonator loop for amplifying said gamma-ray wavelength output.

8. A method for generating a gamma-ray wavelength output, comprising the steps of:
    arranging a high Debye temperature host material between two layers of a first nuclear species having an excited state from interaction with a neutron flux which transitions by particle emission to a second nuclear species having atoms in an excited state generating a population inversion with a ground state for spontaneous emission at said gamma-ray wavelength, wherein said high Debye temperature host material binds said second species for recoilless Mossbauer emission;
    irradiating said first nuclear species with said neutron flux for capture by said first nuclear species, wherein said resulting particle emission produces a recoil velocity in said excited atoms of said second nuclear species for propelling said excited atoms from said first nuclear species layers and into said host material layer for binding said second nuclear species to establish said Mossbauer emissions, thereby producing said gamma-ray wavelength.

9. A method according to claim 8, wherein said host material is selected from the group consisting of beryllium and diamond.

10. A method according to claim 9, wherein said first nuclear species is $^{57}$Co.

11. A method according to claim 10, wherein said first element layer does not exceed 100 Å in thickness.

12. A method according to claim 11, wherein said said receiving material layer is at least 250 Å in thickness.

13. A method according to claim 8, wherein said first nuclear species is $^{57}$Co.

* * * * *